United States Patent
Hui Bon Hoa et al.

(10) Patent No.: US 7,697,123 B2
(45) Date of Patent: Apr. 13, 2010

(54) METHOD OF MEASURING THE DIFFERENTIAL GROUP DELAY OF AN OPTICAL FIBER CONNECTION

(75) Inventors: Daniel Hui Bon Hoa, Lannion (FR); Paulette Gavignet, Tregastel (FR); Christian Dourthe, Lannion (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 12/087,294

(22) PCT Filed: Dec. 15, 2006

(86) PCT No.: PCT/FR2006/051368

§ 371 (c)(1),
(2), (4) Date: Oct. 9, 2008

(87) PCT Pub. No.: WO2007/074277

PCT Pub. Date: Jul. 5, 2007

(65) Prior Publication Data

US 2009/0066937 A1 Mar. 12, 2009

(30) Foreign Application Priority Data

Dec. 28, 2005 (FR) .................................. 0554121

(51) Int. Cl.
*G01N 21/00* (2006.01)
*G01J 4/00* (2006.01)
(52) U.S. Cl. ..................................... 356/73.1; 356/364
(58) Field of Classification Search ....................... None
See application file for complete search history.

(56) References Cited

U.S. PATENT DOCUMENTS 6,266,457 B1 * 7/2001 Jacob .......................... 385/11

6,377,719 B1 * 4/2002 Damask ....................... 385/11
6,459,830 B1 * 10/2002 Pua et al. ..................... 385/11

(Continued)

FOREIGN PATENT DOCUMENTS

WO   WO 2008149027 A2 * 12/2008

OTHER PUBLICATIONS

Y. Benlachtar et al., "Novel Eye Monitoring Technique for Detection of First Order PMD", Quantum Electronics and Laser Science, 2005 Conference Baltimore, MD, USA, May 22-27, 2005, pp. 1789-1791.

(Continued)

*Primary Examiner*—Tarifur Chowdhury
*Assistant Examiner*—Gordon J Stock, Jr.
(74) *Attorney, Agent, or Firm*—David D. Brush; Westman, Champlin & Kelly P.A.

(57) ABSTRACT

Apparatus for measuring the differential group delay $\tau_1$ in an optical fiber connection. The apparatus comprises at the inlet to said connection, a generator (10) for generating a binary signal sequence at a data rate D and a first polarization controller (30) suitable for subjecting the binary signal of an incoming sequence to a first scan through polarization states; and at the outlet from the connection, a second polarization controller (60) suitable for subjecting the signal resulting from the outgoing sequence to a second scan through polarization states, independently of said first polarization scan, a differential group delay emulator (70) suitable for introducing a variable additional group delay $\tau_2$, and an analyzer device (90) suitable for detecting the equality $\tau_1+\tau_2=1/D$ in the resulting signal sequence.

9 Claims, 3 Drawing Sheets

U.S. PATENT DOCUMENTS

| | | | |
|---|---|---|---|
| 6,559,991 B1 * | 5/2003 | Farley et al. | 398/152 |
| 6,654,103 B2 * | 11/2003 | Yu et al. | 356/73.1 |
| 6,654,105 B2 * | 11/2003 | Wang et al. | 356/73.1 |
| 6,704,100 B2 * | 3/2004 | Sengupta et al. | 356/73.1 |
| 2003/0117612 A1 | 6/2003 | Wight et al. | |
| 2004/0022507 A1 * | 2/2004 | Galtarossa et al. | 385/123 |
| 2004/0096140 A1 * | 5/2004 | Zeng | 385/11 |
| 2004/0151495 A1 * | 8/2004 | Knox et al. | 398/25 |
| 2007/0274732 A1 * | 11/2007 | D'Errico et al. | 398/202 |
| 2009/0028565 A1 * | 1/2009 | Yao | 398/79 |

OTHER PUBLICATIONS

J. Wang et al., "Experiments of Polarization Mode Dispersion Compensation for a 10Gbit/s System", Proceedings of SPIE—vol. 5281, Optical Transmission Switching and Subsystems, Cedric F. Lam, ChongCheng Fan, Norbert Hanik, Kimio Oguchi, Editors, vol. 5281, May 2005, pp. 309-313.

* cited by examiner

METHOD OF MEASURING THE DIFFERENTIAL GROUP DELAY OF AN OPTICAL FIBER CONNECTION

RELATED APPLICATIONS

This is a U.S. national stage under 35 USC 371 of application No. PCT/FR2006/051368, filed on Dec. 15, 2006.

This application claims the priority of French patent application no. 0554121 filed Dec. 28, 2005, the content of which is hereby incorporated by reference.

FIELD OF THE INVENTION

The present invention relates to a method of measuring differential group delay in an optical fiber connection.

The invention finds an advantageous application in the general field of performing measurements on optical fibers, and more particularly in the field of qualifying an optical fiber connection when accepting high data rate and long-range optical transmission systems.

BACKGROUND OF THE INVENTION

In an optical fiber transmission system, the connection, including both line fiber sections and chromatic dispersion compensation fiber sections, connectors, and multiplexers/demultiplexers, together with couplers, filters, isolators, circulators, amplifiers, etc., behaves like a birefringent medium and induces effects that are harmful for signal propagation, giving rise in particular to variation in group delay time depending on the polarization angles of the light signals transmitted relative to the fast and slow axes of local birefringence, as shown in FIG. 1. In other words, as shown in FIG. 2, a propagation time difference, known as the differential group delay (DGD), appears between signals that are polarized along the fast axis and signals polarized along the slow axis. This delay $t_2-t_1$ written $\tau_1$, depends on the number of birefringent elements that have been passed through, and on the wavelength used.

As can also be seen in FIG. 2, this propagation time dispersion has the consequence of broadening the resulting light pulses after it has been conveyed along the optical connection, which broadening must be kept within a tolerance range specified by a value DGDmax that is determined as a function of the data rate, the coding, and the modulation format of the signal. DGDmax must be less than ½ where D is the data rate in bits per second (bit/s) of the light pulses transmitted over the connection.

DGD is essentially an instantaneous magnitude, since it depends on numerous physical factors that can vary over time, such as temperature, local applied stresses, etc.

Furthermore, the total dispersion due to the polarization of the light and to the birefringence of the medium can also be characterized by another magnitude known as polarization mode dispersion (PMD) that takes account of the average of the DGDs for all of the polarization states and for the entire optical spectrum conveyed by the fiber over the duration of the PMD measurement. It has been shown that the various DGD values that are obtained over a broad spectrum range and over a short duration, e.g. over a few minutes, correspond to the values that the DGD can take at a given wavelength over a longer period of time, e.g. of the order of several days. This broadband optical measurement can be performed if, and only if, a significant spectrum range is explored, and consequently, the spectrum range that can be covered by the passband of a channel in a wavelength division multiplexing (WDM) system, as set by the optical multiplexers/demultiplexers of the terminals or by the optical add drop multiplexers (OADMs) is found to be too small to enable such a measurement to be performed.

It is possible, in known manner, to estimate a maximum differential group delay value DGDmax from the measured PMD by calculating the probability of a DGD value being exceeded as a function of a statistical model of DGD distribution, such as the now-standardized Maxwell distribution.

A known method of measuring PMD over an optical fiber connection consists in measuring PMD on fiber sections of the connection by means of a broadband light source or a light source that is turnable over a broad band, e.g. a band of several tens of nanometers. For this purpose, it is possible to make use of the entire optical passband of a WDM connection. A polarization controller makes it possible to simulate all of the polarization states of the signal at the inlets of fiber sections. At the outlets from the sections, a second controller serves to analyze all of the polarization states of the received signal. The PMD value is estimated from interferograms of the received signal or from an analysis of polarization states, implementing a Jones matrix, Stokes parameters, or the Poincaré sphere, for each wavelength and for each analyzed polarization state. Probabilistic processing covering all of the polarization states and all of the wavelengths gives an estimate for the PMD value, and thus an estimate for DGDmax by applying the above-mentioned statistical model.

That known method of estimating DGD nevertheless presents a certain number of drawbacks. Firstly, it does not enable an instantaneous value of DGD to be obtained, even though that is of very great importance when it is desired to qualify a connection for acceptance purposes. Furthermore, it constitutes a method that is intrusive, causing traffic to be interrupted since it requires the optical line to be interrupted in order to insert the measurement equipment. Finally, only optical fiber sections are taken into account rather than all of the elements in the connection, and in particular the terminals and the OADMs are not taken into account.

SUMMARY OF THE INVENTION

Thus, one object of the present invention is to provide a method of measuring differential group delay $t_1$ in an optical fiber connection that makes it possible to deliver an instantaneous value for the total DGD of the connection at a given wavelength, even in the presence of an OADM, which value is valid at least for the duration of the measurement, and in which measurement can be performed without interrupting traffic at other wavelengths.

This and other objects are obtained in accordance with one aspect of the present invention directed to a method comprising steps of:

at the inlet to said connection, generating a binary signal sequence at a data rate D, and in subjecting said binary signal to a first scan through polarization states; and at the outlet from the connection, in subjecting the binary signal of the outgoing sequence to a second scan through polarization states, independently of said first scan, in introducing a known additional differential group delay $\tau_2$, in causing said differential group delay to vary until detecting the equality $\tau_1+\tau_2=1/D$ in the resulting signal sequence, and in deducing therefrom the looked-for differential group delay $\tau_1$.

Thus, knowing the value $\tau_2$ of the introduced additional delay at each instant and also knowing the bit rate value D in bit/s, it is possible to deduce immediately the instantaneous value $\tau_1$ of the DGD.

Furthermore, as explained below, the method in accordance with an embodiment of the invention can be applied very simply, e.g. on a WDM connection, without interrupting traffic, by using an available wavelength between the emitter terminal and the receiver terminal, i.e. over the connection as a whole from terminal to terminal and not merely over sections of line fiber.

In a first implementation, the step of detecting the equality $\tau_1+\tau_2=1/D$, where $\tau_1$ and $\tau_2$ are less than $1/D$ and where their sum is no greater than $1/D$, is performed by observing an eye diagram of the signal sequence resulting from combining the fast and slow components of the conveyed optical signal, said equality being achieved when said eye diagram presents a three-level signal with maximum intensity for the central level.

In a second implementation, the step of detecting $\tau_1+\tau_2=1/D$ is performed by observing a histogram of the levels in the eye diagram of the resulting signal, said equality being achieved when said histogram presents three lobes and the central lobe reaches a maximum amplitude.

Another aspect of the invention is directed to an apparatus for measuring the differential group delay $t_1$ in an optical fiber connection, which apparatus comprises:

at the inlet to said connection, a generator for generating binary signal sequences at a data rate D, and a first polarization controller suitable for subjecting the binary signal of the incoming binary sequence to a first scan through polarization states; and at the outlet from the connection, a second polarization controller suitable for subjecting the signal resulting from combining the fast and slow components of the optical signal conveyed by the connection to a second scan through polarization states, independently of said first polarization scan, a differential group delay emulator suitable for introducing a variable additional differential group delay $\tau_2$, and an analyzer device suitable for detecting the equality $\tau_1+\tau_2=1/D$ in the sequence of the resulting signal after the differential group delay emulator.

In both the first and the second implementations, said analyzer device is an oscilloscope fitted with an optical receiver head making it possible to observe an eye diagram of the received resultant signal and to generate a histogram of the signal levels, in particular to provide the amplitude of the central level of a resultant signal sequence that passes progressively from two to three levels with increasing additional differential group delay $\tau_2$.

Finally, when said connection is a WDM connection, the invention provides for said signal sequence generator and said polarization controller to be disposed on an inlet channel of the multiplexer of said connection, and said second polarization controller, said differential group delay emulator, and said analyzer device to be disposed on the outlet channel of the connection associated with said inlet channel.

DETAILED DESCRIPTION OF THE DRAWINGS

Figure 2:
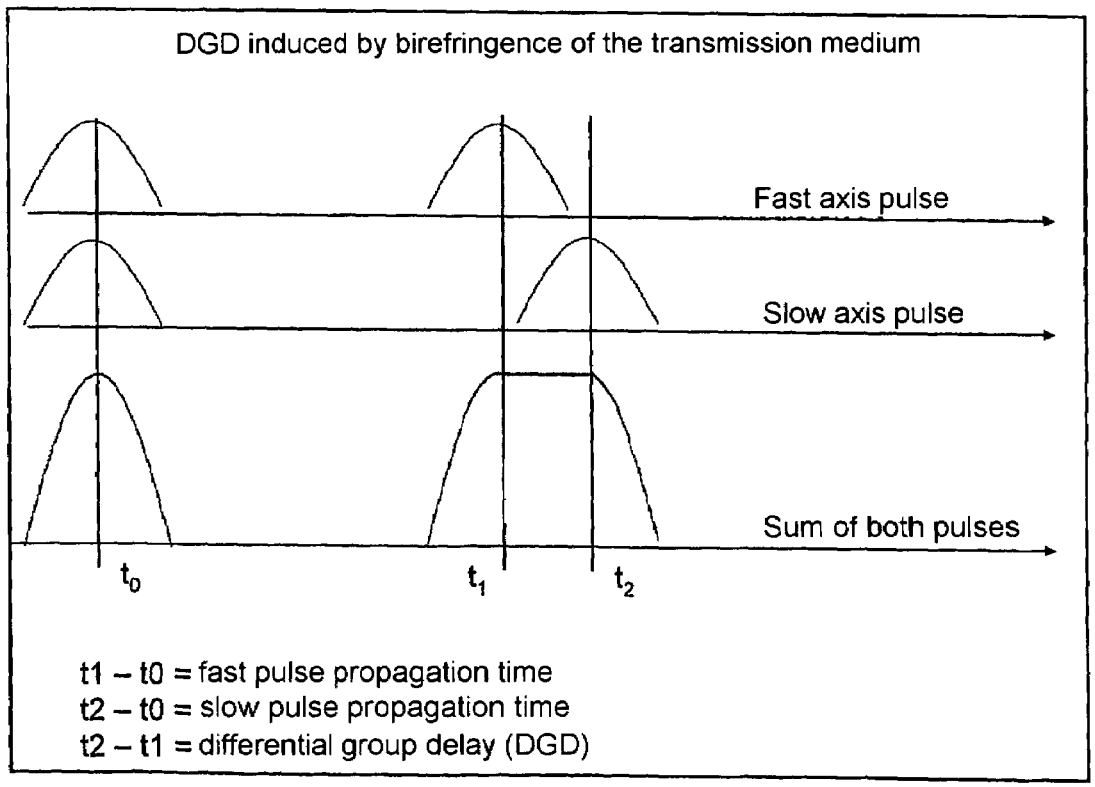
FIG. 2 shows timing diagrams for the propagation of the components of a light pulse for polarizations parallel to each of the main polarization axes of the FIG. 1 optical fiber, and also shows the resulting sum signal after propagation in the fiber, revealing pulse broadening.
Figure 3:
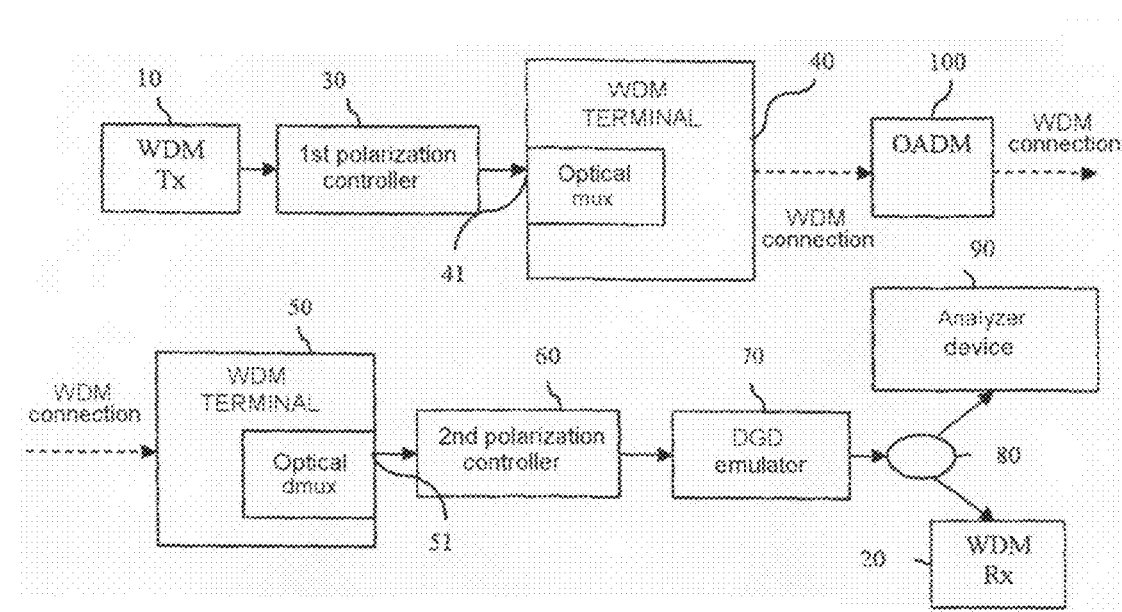
FIG. 3 is a diagram of apparatus for implementing the method in accordance with an embodiment of the invention.

FIG. 3 shows apparatus for measuring differential group delay in an optical fiber connection when using wavelength division multiplexing. This delay, written $\tau_1$ corresponds to the different $t_2-t_1$ shown in FIG. 2.

The apparatus can make use of the transponders and the multiplexers/demultiplexers of the WDM transmission system that already exist for the purposes of generating and detecting a binary signal sequence for use as a test signal for measuring DGD. The data rate of this sequence is written D. Typically, D is about 10 gigabits per second (Gbit/s) in the experiment undertaken to validate the invention.

The source 10 generating the test sequence is a transmitter of the WDM system. The receiver 20 corresponding to the source 10 is used to measure the transmission binary error rate at the other end of the connection as a function of polarization states and of the total DGD $\tau_1+\tau_2$. The source 10 is tuned to the wavelength of an inlet port of the optical multiplexer 41 of the terminal 40 to which it is connected.

The FIG. 3 apparatus uses a first polarization controller 30 placed between the source 10 and the input of the optical multiplexer 41, for the purpose of subjecting the binary signal of a test sequence incoming into the multiplexer 41 to a first scan over all of polarization states.

Figure 1:
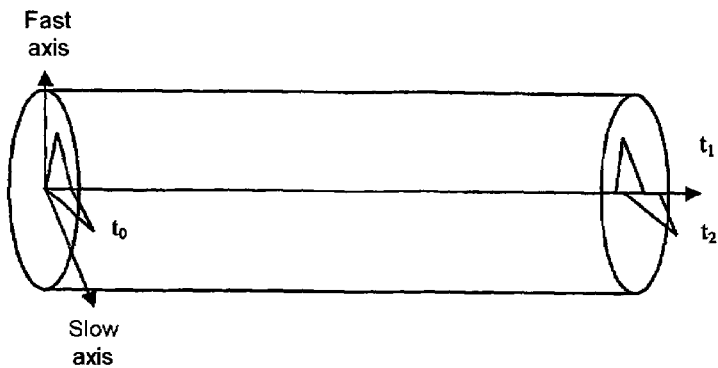
FIG. 1 is a diagram representing a birefringent optical fiber together with the associated main polarization axes.

At the other end of the connection, the optical demultiplexer 51 in the line terminal 50 delivers the sequence as conveyed over the connection. Giving consideration to the problem associated with the birefrigence of the optical elements through which the light has passed, the connection behaves like a medium that presents two main polarization axes, as shown in FIG. 1. A second polarization controller 60 placed at the outlet from the optical demultiplexer 51 acts in the same manner to subject the test sequence signal at the outlet from the demultiplexer 51 to a second scan through all polarization states. This second polarization scan is performed independently of the scan performed by the first polarization controller 30.

In addition, a differential group delay emulator 70 connects the output of the second polarization controller 60 to an optical coupler 80, enabling a portion of the signal to be sent towards an analyzer device 90. The emulator 70 introduces a variable amount of additional DGD $\tau_2$ between the two main polarization axes, which delay is added to the looked-for DGD $\tau_1$ when the fast component of the signal at the inlet to the emulator coincides with its birefringence fast axis. The DGD emulator 70 creates artificial birefringence by introducing an additional delay to one of the polarizations, and then recombining the two polarizations.

The WDM connection may include one or more OADMs 100 between the terminals 40 and 50; the OADMs are transparent at the measurement wavelength.

In general, the purpose of the analyzer device 90 is to ensure that $\tau_1+\tau_2=1/D$ on the basis of the resultant signal sequence leaving the DGD emulator 70. When the above equality is true for a given value of $\tau_2$, then $\tau_1$ can be deduced immediately, since D is known from other means as the unchanging data rate of the transmitter of the WDM system.

In a particular embodiment, the analyzer device 90 is constituted by a sampling digital oscilloscope receiving a signal output from the coupler 80. The oscilloscope serves to display the corresponding eye diagram, which is the result of superposing all of the samples of the received signals in the same window, and it also serves to provide a histogram of the received signal levels.

The principle on which the DGD measurement method relies is examining variation in the eye diagram and the histogram observed during changes in the polarization states of the signals produced by the two polarization controllers and by the differential group delay emulator.

In particular, it can be observed that a three-level eye diagram is obtained after the emulator 70, providing the following conditions are satisfied:

the linear polarization angle of the signal at the inlet to the multiplexer 41 is 45° relative to the main polarization axes of the connection;

the polarization of the signal at the output from the multiplexer 51 is transformed into linear polarization at 45° relative to the main polarization axes of the emulator 70;

the fast component of the signal is aligned with the fast axis of the emulator; and the sum of the delays $\tau_1$ and $\tau_2$ of the connection and of the emulator is equal to the bit period 1/D.

Figure 4:
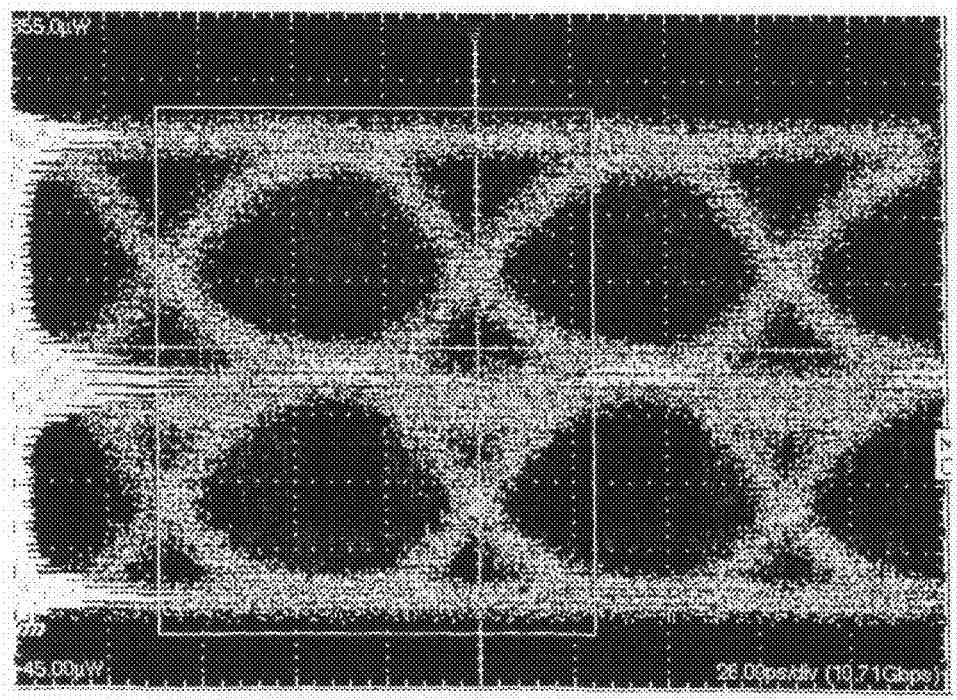
FIG. 4 shows an oscilloscope screen displaying an eye diagram of a signal sequence having three levels that result from the method in accordance with an embodiment of the invention, together with a three-lobe histogram of the levels obtained, the histogram being incrusted vertically on the left-hand side of FIG. 4.

Under such conditions, the eye diagram shown in FIG. 4 is obtained, which reveals a three-level signal with a contrast maximum for the central level. The same figure shows, plotted vertically on the left-hand side a three-lobe histogram representing the three levels of the eye diagram which, under the same conditions, reveal a central lobe of maximum amplitude.

Figure 5:
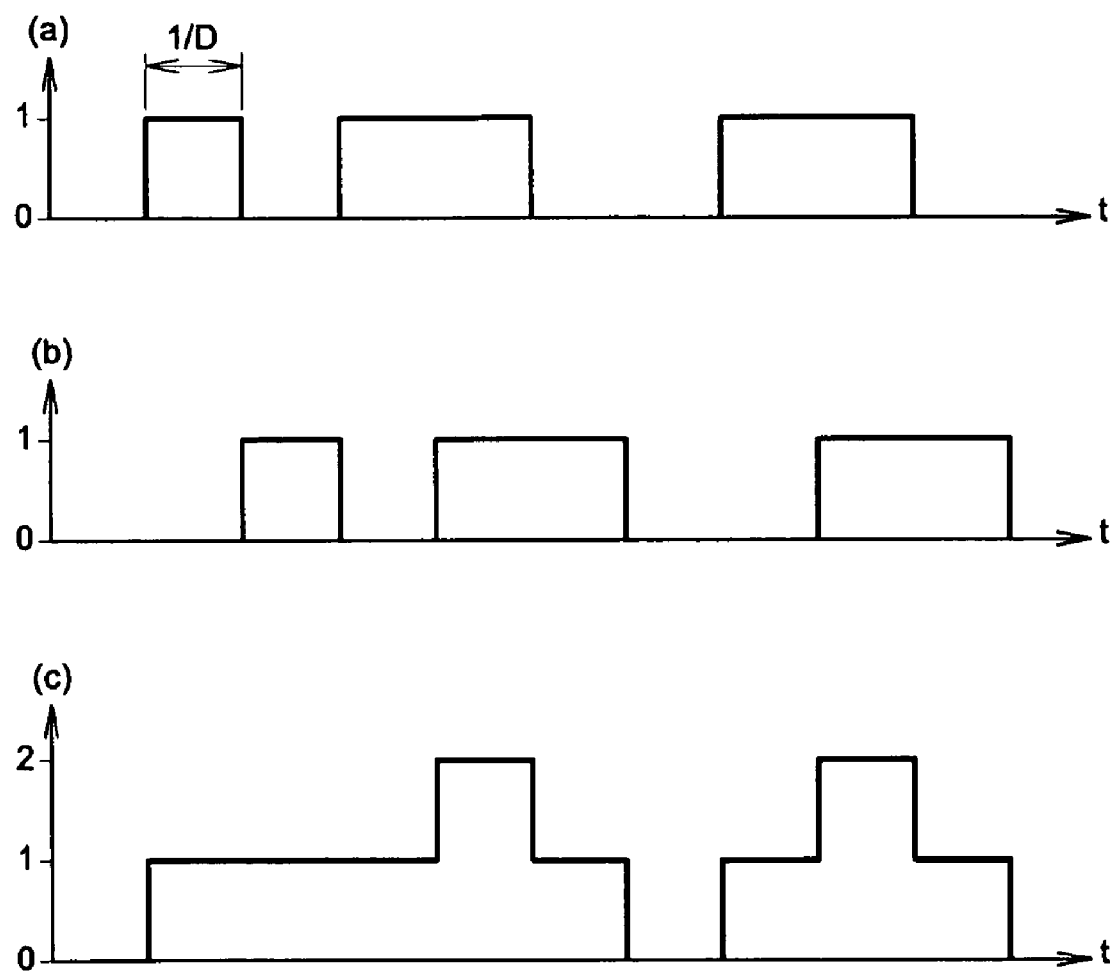
FIG. 5 shows a timing chart (a) for a binary signal sequence propagating along the fast axis of the connection, a timing chart (b) for the same binary signal sequence propagating along the slow axis and delayed by $1/D$, and a timing chart (c) showing the sum of the two preceding timing charts and clearly revealing the three levels of the resulting signal.

FIG. 5 confirms the validity of the above four conditions, showing a timing chart (c) with three levels as obtained when the condition $\tau_1+\tau_2=1/D$ is satisfied. This timing chart is the result of summing the chart (a) for a fast axis sequence and the chart (b) for the same sequence on the slow axis when delayed by 1/D.

In practice, the measurement procedure consists initially in adjusting the first controller 30 with a delay $\tau_2$ of 0 picoseconds (ps) in the emulator 70. The polarization state at the inlet to the optical multiplexer 41 is varied while observing the eye diagram on the oscilloscope, until it becomes as closed as possible.

Thereafter, a value other than 0 is selected for $\tau_2$, and the second controller 60 is adjusted to obtain an eye diagram that is more closed than the preceding diagram. The first controller 30 might possibly be adjusted again in order to minimize the opening of the diagram.

The value of $\tau_2$ is increased progressively, and on each occasion, the second controller 60 is adjusted, and possibly also the first controller 30, until a three-level diagram is observed as can be seen in FIG. 4. The histogram of the signals then presents three lobes corresponding to the three levels of the signal: high (2); central (1); and low (0); as in the timing chart (c) of FIG. 5. The purpose of the optimization procedure is to maximize the height of the central lobe of the histogram by adjusting the two controllers and the value $\tau_2$ of the emulator DGD starting from an initial value of zero for $\tau_2$. The value of $\tau_2$ is always less than or at most equal to 1/D. Likewise, the sum $\tau_1+\tau_2$ is less than or at most equal to 1/D.

The value $\tau_1$ of the DGD of the connection that is observable during the measurement period is thus the 1/D complement of the DGD value $\tau_2$ selected for the emulator 70. This DGD value can vary depending on surrounding conditions, for example temperature and mechanical stresses exerted on the fiber. It is assumed to be constant while measurements are being performed.

Simultaneously, values can be taken from the receiver 20 for the transmission binary error rate, thus making it possible to estimate the DGD operating margin of the system.

Thus, the apparatus in accordance with the invention makes use of optical and electrical measuring equipment that is in common use, such as polarization controllers, a DGD emulator, a photoreceiver adapted to the data rate D of the signal, a sampling digital oscilloscope, and the transmitters and receivers already present in the WDM system.

Furthermore, only one optical multiplexing channel is used for determining the DGD of the connection, so the traffic on the other channels is not disturbed by taking the measurement.

The method in accordance with the invention can be used when putting into service any wavelength in order to qualify the differential group delay of the connection prior to applying new traffic thereto.

Instead of using the transmitters and receivers of the WDM system, it is also possible to use an external test generator/receiver operating at an unused wavelength of the optical multiplex. This makes it possible to perform measurements without interrupting traffic. Since this wavelength is not the wavelength of any of the channels in service, it is not possible to deduce the DGDs of those channels therefrom. Nevertheless, by performing measurements at a plurality of unused wavelengths in the multiplex, it is possible by interpolation to estimate the DGD values for the channels in service, providing the curve plotting variations in DGD as a function of wavelength is continuous and varies slowly with wavelength.

The test sequence presenting a narrow optical bandwidth can pass through optical filters and OADMs without disturbing the measurement method.

The invention claimed is:

1. A method of measuring differential group delay $\tau_1$ in an optical fiber connection, comprising the steps of:
    at an inlet to the connection, generating a binary signal sequence at a data rate D, and subjecting said binary signal to a first scan through polarization states; and
    at an outlet from the connection, subjecting the binary signal of the outgoing sequence to a second scan through polarization states, independently of said first scan, introducing a known additional differential group delay $\tau_2$, causing said known differential group delay $\tau_2$ to vary until detecting an equality $\tau_1+\tau_2=1/D$ in a resulting signal sequence, and deducing therefrom the differential group delay $\tau_1$.

2. A method according to claim 1, wherein the step of detecting the equality $\tau_1+\tau_2=1/D$ is performed by observing an eye diagram of the resulting signal sequence, said equality being achieved when said eye diagram presents a three-level signal with maximum intensity for a central level.

3. A method according to claim 1, wherein the step of detecting the equality $\tau_1+\tau_2=1/D$ is performed by observing a histogram of levels in an eye diagram of the resulting signal sequence, said equality being achieved when said histogram presents three lobes and a central lobe reaches a maximum amplitude.

4. An apparatus for measuring the differential group delay $\tau_1$ in an optical fiber connection, comprising:
    at an inlet to said connection, signal sequence generator means for generating a binary signal sequence at a data rate D, and first polarization controller means for subjecting the binary signal of the incoming sequence to a first scan through polarization states; and at an outlet from the connection, second polarization controller means for subjecting the binary signal of the outgoing sequence to a second scan through polarization states, independently of said first polarization scan, differential group delay emulator means for introducing a variable additional differential group delay $\tau_2$, and an analyzer device that detects an equality $\tau_1+\tau_2=1/D$ in a sequence of a resulting signal after the emulator means.

5. The apparatus according to claim 4, wherein said analyzer device comprises a histogram generator for providing a histogram of the levels of a resulting signal sequence.

6. The apparatus according to claim 4, wherein said connection is a WDM connection, and said signal sequence generator means and said first polarization controller means are disposed on an inlet channel of a multiplexer of said connection, and wherein said second polarization controller means, said differential group delay emulator means and said analyzer device are disposed on an outlet channel of the connection associated with said inlet channel.

7. The apparatus according to claim 6, wherein said WDM connection includes at least one optical add-drop multiplexer (OADM).

8. A system comprising:

a polarization controller placed at an outlet from an optical fiber connection that is suitable for transmitting a signal comprising a binary signal sequence at a data rate D and having a differential group delay $\tau_1$ introduced by the connection, the polarization controller being configured to subject the signal to a scan through polarization states;

a differential group delay emulator configured to introduce a variable additional differential group delay $\tau_2$ into an output of the polarization controller such that $\tau_1+\tau_2=1/D$; and an analyzer device that detects $\tau_1+\tau_2=1/D$.

9. The system according to claim 8, wherein the analyzer device comprises at least a sampling digital oscilloscope that is capable of displaying an eye diagram of a resulting signal sequence in an output of the differential group delay emulator.

* * * * *